(12) United States Patent
Wadke et al.

(10) Patent No.: US 8,066,792 B2
(45) Date of Patent: Nov. 29, 2011

(54) APPARATUS, SYSTEM, AND METHOD FOR INSULATING AN EXHAUST AFTERTREATMENT COMPONENT

(75) Inventors: Aashish Wadke, Stoughton, WI (US); Scott Lubenow, Fitchburg, WI (US); Chris Cremeens, McFarland, WI (US); Jason Drost, Edgerton, WI (US); Daniel W. Woods, Rewey, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 239 days.

(21) Appl. No.: 12/327,725

(22) Filed: Dec. 3, 2008

(65) Prior Publication Data

US 2010/0132322 A1    Jun. 3, 2010

(51) Int. Cl.
*B01D 39/06*    (2006.01)

(52) U.S. Cl. ........................ 55/523; 55/DIG. 30; 422/177; 60/311; 60/322

(58) Field of Classification Search ............... 55/522, 55/523, 524, 526, 527, 528; 422/177, 179, 422/180; 60/299, 301, 302, 311, 322
See application file for complete search history.

(56) References Cited

U.S. PATENT DOCUMENTS

| | | | | |
|---|---|---|---|---|
| 3,876,384 A | * | 4/1975 | Santiago et al. | 422/179 |
| 3,948,611 A | * | 4/1976 | Stawsky | 422/179 |
| 4,002,433 A | | 1/1977 | Oser | |
| 4,142,864 A | * | 3/1979 | Rosynsky et al. | 422/179 |
| 4,302,495 A | * | 11/1981 | Marra | 428/110 |
| 4,999,168 A | * | 3/1991 | Ten Eyck | 422/179 |
| 5,082,297 A | * | 1/1992 | Flasher | 277/608 |
| 5,571,592 A | * | 11/1996 | McGregor et al. | 428/71 |
| 5,611,831 A | * | 3/1997 | Matsuoka et al. | 55/486 |
| 5,782,089 A | * | 7/1998 | Machida et al. | 60/299 |
| 5,829,132 A | * | 11/1998 | Sickels et al. | 29/890 |
| 5,882,608 A | | 3/1999 | Sanocki et al. | |
| 5,968,456 A | * | 10/1999 | Parise | 422/174 |
| 5,974,784 A | * | 11/1999 | Feldman | 60/272 |
| 6,017,498 A | * | 1/2000 | Harding | 422/179 |
| 6,116,022 A | * | 9/2000 | Woodward | 60/300 |
| 6,613,296 B1 | * | 9/2003 | Myers et al. | 422/179 |

(Continued)

FOREIGN PATENT DOCUMENTS

EP    1744024 A2    1/2007

OTHER PUBLICATIONS

PCT/US2009/066625, International Search Report and Written Opinion, Jul. 13, 2010.

*Primary Examiner* — Duane Smith
*Assistant Examiner* — Thomas McKenzie
(74) *Attorney, Agent, or Firm* — Kunzler Needham Massey & Thorpe (57) ABSTRACT

According to one representative embodiment, an exhaust aftertreatment component that includes a housing that defines an interior cavity through which exhaust gas is flowable. The housing includes an inner body, an outer body, and a space defined between the inner and outer bodies. The component also includes an insulation pack that is positioned within the space. The insulation pack includes insulation media encapsulated by a flexible fabric. The insulation pack further includes an at least partially rigid member that has a rigidity greater than a rigidity of the insulation media and flexible fabric.

30 Claims, 7 Drawing Sheets

U.S. PATENT DOCUMENTS

| | | |
|---|---|---|
| 6,726,884 B1 | 4/2004 | Dillon et al. |
| 6,923,942 B1 * | 8/2005 | Shirk et al. ............... 422/179 |
| 7,441,334 B2 * | 10/2008 | Roe et al. ................. 29/890 |
| 7,708,796 B2 * | 5/2010 | Rieger et al. .............. 55/502 |
| 2005/0036923 A1 * | 2/2005 | Brisbin et al. ............. 422/179 |
| 2005/0272338 A1 * | 12/2005 | Shaffer ................... 442/174 |
| 2006/0067860 A1 * | 3/2006 | Faircloth et al. ............ 422/171 |
| 2006/0096262 A1 * | 5/2006 | Andersen et al. ............ 55/523 |
| 2006/0141884 A1 * | 6/2006 | Haque .................... 442/361 |
| 2010/0209679 A1 * | 8/2010 | Tompkins ................. 428/201 |
| 2011/0030356 A1 * | 2/2011 | Yasuda ................... 60/299 |

\* cited by examiner

APPARATUS, SYSTEM, AND METHOD FOR INSULATING AN EXHAUST AFTERTREATMENT COMPONENT

FIELD

This invention relates to exhaust systems for internal combustion engines, and more particularly to insulating exhaust aftertreatment system components.

BACKGROUND

Exhaust aftertreatment systems receive and treat exhaust generated from an internal combustion engine. Typical exhaust aftertreatment systems include any of various components configured to reduce the level of harmful exhaust emissions present in the exhaust. For example, some exhaust aftertreatment systems for diesel powered internal combustion engines include a particulate matter filter, a diesel oxidation catalyst, and a selective catalytic reduction (SCR) catalyst. Hot exhaust gas from the engine passes through each of the components before being expelled into the environment.

The exhaust aftertreatment components include a housing that defines an interior cavity in which an exhaust-treating filter or catalyst is housed. As the hot exhaust gas passes through the interior cavity, heat from the exhaust gas can increase the surface temperature of the walls of the housing. Due to potential safety hazards associated with excessive surface temperatures, safety regulations are in place to limit the maximum temperature of the external surfaces of the housings. In order to comply with the safety regulating, attempts have been made to reduce the external surface temperature of exhaust aftertreatment components. In one conventional exhaust aftertreatment system, a layer of insulation layer is wrapped over the external surface of the component housings.

In another conventional exhaust aftertreatment system, a layer of insulation is positioned within a space defined between an external wall and an internal wall of the component housings. This method is particularly useful where the external surface of the component is used for clamping the component to a vehicle and thus cannot be covered with insulation. The space is a fully enclosed compartment that is not directly exposed to the hot exhaust gas as it passes through the component. Further, the external and internal walls of the component housings are not configured to compress the insulation layer.

SUMMARY

The subject matter of the present application has been developed in response to the present state of the art, and in particular, in response to the problems and needs in the art that have not yet been fully solved by currently available exhaust aftertreatment system component insulators. Accordingly, the subject matter of the present application has been developed to provide an apparatus, system, and method for insulating exhaust aftertreatment components that overcomes at least some of the following or other shortcomings of the prior art insulation techniques.

Wrapping insulation that is wrapped around the exterior of exhaust aftertreatment components, according to known techniques, may cover clamping areas necessary for securing the components to a vehicle. While not covering the exterior of a component, insulation encapsulated in a foil positioned within a fully enclosed compartment defined between an exterior and interior wall, according to other known techniques, does not provide an adequate seal for preventing passage of exhaust gas between the insulation and the exterior and interior walls.

Insulation encapsulated in a fabric positioned within the fully enclosed compartment is not exposed to the hot exhaust gas and thus need not seal the compartment. However, other methods must be used to adequately seal the compartment from exposure to exhaust gas, such as precise and full welding, which requires additional manufacturing steps and costs. If insulation encapsulated in fabric is exposed to hot exhaust gas, the insulation is not compressed to seal the compartment. Further, without compression of the insulation, the insulation fiber may be free to migrate from the insulation and into the aftertreatment component, which may reduce the efficiency of the component. Additionally, known insulation encapsulated in a fabric is not rigid enough to be installed in a compartment designed to compress the insulation such as described herein. Generally, to install fabric encapsulated insulation, the insulation is fed through the compartment in the aftertreatment component. If the compartment is designed to compress the insulation and the insulation is not adequately rigid, it can bunch up and prevent movement as the insulation is fed into the compartment. Accordingly, the subject matter of the present application has been developed to provide an apparatus and system for insulating exhaust aftertreatment components that overcomes at least some shortcomings of the prior art insulation techniques.

According to one representative embodiment that overcomes one or more shortcomings of the prior art, an exhaust aftertreatment component that includes a housing that defines an interior cavity through which exhaust gas is flowable. The housing includes an inner body, an outer body, and a space defined between the inner and outer bodies. The component also includes an insulation pack that is positioned within the space. The insulation pack includes insulation media encapsulated by a flexible fabric. The insulation pack further includes an at least partially rigid member that has a rigidity greater than a rigidity of the insulation media and flexible fabric.

In one implementation, the insulation pack has a length that extends substantially perpendicular to an axis of the housing. The rigidity of the at least partially rigid member, the insulation media, and the flexible fabric is an axial rigidity substantially parallel to the axis of the housing.

According to some implementations, the at least partially rigid member is a sheet. The at least partially rigid member can be embedded within the insulation media. Alternatively, the at least partially rigid member is secured to an exterior surface of the flexible fabric. The at least partially rigid member can extend laterally from a first side of the insulation pack to a second side of the insulation pack. In one implementation, the at least partially rigid member is configured to combust during operation of the component.

In certain implementations, the outer body of the component compresses the insulation pack against the inner body in a direction substantially perpendicular to an axis of the component. Also, in some implementations, the insulation pack forms a seal with the inner and outer bodies to prevent exhaust gas from passing between the insulation pack and the inner and outer bodies.

According to some implementations, the inner body is insertable into the outer body. The inner body can have a generally cylindrical shape and includes an inner wall and two spaced-apart side walls extending radially outward from the inner wall. The space described above can be defined between the outer body, and the inner wall and two side walls of the inner body. A gap can be defined between at least one of the two side walls of the inner body and the outer body. The flexible fabric of the insulation pack can be contactable with hot exhaust gas passing through the gap.

In another embodiment, an exhaust aftertreatment component includes an outer body, an inner body spaced apart from the outer body, a compartment defined between the outer and inner bodies, an insulation pack positioned within the compartment. The insulation pack includes insulation media encapsulated by a flexible fabric. The outer body applies a compressive force to the insulation pack to compress the insulation pack against the inner body.

According to some implementations, the insulation pack is deformable under the compressive force to form a seal between the outer and inner bodies. The compressive force can be a radial compressive force perpendicular to a central axis of the component. The insulation pack can include a rigid member that has an axial rigidity greater than an axial rigidity of the insulation pack and flexible fabric. The compressive force can be a radial compressive force perpendicular to a central axis of the component and the insulation media can have an axial rigidity greater than a radial rigidity.

According to yet another embodiment, a method for making an exhaust aftertreatment component includes providing a first body that includes a first inner surface and first outer surface. The first inner surface defines a first interior cavity. The method includes providing a second body that includes a second inner surface and a second outer surface. The second inner surface defines a second interior cavity. The method also includes positioning an insulation pack about the first body along the first outer surface where the insulation pack includes insulation media enveloped by a fabric. Further, the method includes inserting the first body into the second interior of the second body such that the insulation pack is positioned between the first outer surface and the second inner surface. Additionally, the method includes compressing the insulation pack with the second body as the first body is inserted into the second interior of the second body.

In some implementations, the first and second bodies are each generally cylindrically shaped and compressing the insulation pack includes radially inwardly compressing the insulation pack. Inserting the first body into the second interior of the second body can include inserting the first body into the second interior of the second body in a substantially axial direction. The method can further include resisting axial compression of the insulation pack as the first body is inserted into the second interior of the second body. In certain implementations, the axial compression resistance is facilitated by an axially rigid member coupled to the insulation pack. In other implementations, the insulation media of the insulation pack is axially rigid and the axial compression resistance is facilitated by the axially rigidity of the insulation media.

In some implementations, the insulation pack includes a first thickness prior to the first body being inserted into the second interior of the second body. The first thickness is greater than a maximum distance between the first outer surface and second inner surface after the first body is inserted into the second interior of the second body. Compressing the insulation pack can then include reducing a thickness of the insulation pack from the first thickness to a second thickness approximately equal to the maximum distance between the first outer surface and the second inner surface.

According to specific implementations, the method further includes deforming the insulation pack into sealed engagement with the first outer surface and second inner surface. In other specific implementations, the method includes sealing the first outer surface and second inner surface with the insulation pack.

According to another embodiment, an insulation pack for insulating an exhaust aftertreatment component along an interior of the component includes an insulation media and a flexible fabric that encapsulates the insulation media. The component defines a central axis. Relative to the central axis, the insulation pack is radially compressible and substantially axially incompressible. The component can include means for providing axial rigidity.

According to some implementations, the component includes an axial stabilizer coupled to at least one of the insulation media and flexible fabric. The axial stabilizer can include a metal foil. In certain implementations, the insulation media includes at least two insulation media layers and the axial stabilizer includes an adhesive coupling the insulation media layers together.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Discussion of the features and advantages, and similar language, throughout this specification may, but do not necessarily, refer to the same embodiment.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. These features and advantages of the present invention will become more fully apparent from the following description and appended claims, or may be learned by the practice of the invention as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are provided to impart a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Described herein are various embodiments of an insulation pack for insulating various components of an exhaust aftertreatment system coupled to an internal combustion engine. In one embodiment, the insulation pack is fitted along an interior of a component such that it does not interfere with clamping areas on the exterior of the component. The insulation pack can have a flexible fabric encapsulating an insulation media. The insulation pack can be radially compressed to form a seal between the insulation pack and the component, as well as to prevent migration of insulation fibers. The insulation pack can include an axial stabilizer or rigid member to substantially reduce compression in the axial direction. The axial stabilizer facilities installation of the insulation pack within the component without undesirable bunching of the pack. Also, the fabric can be a high temperature fabric capable of withstanding high temperatures of exhaust gas passing through the component. Therefore, in some implementations, the flexible fabric can be in direct contact with the exhaust gas.

Figure 1:
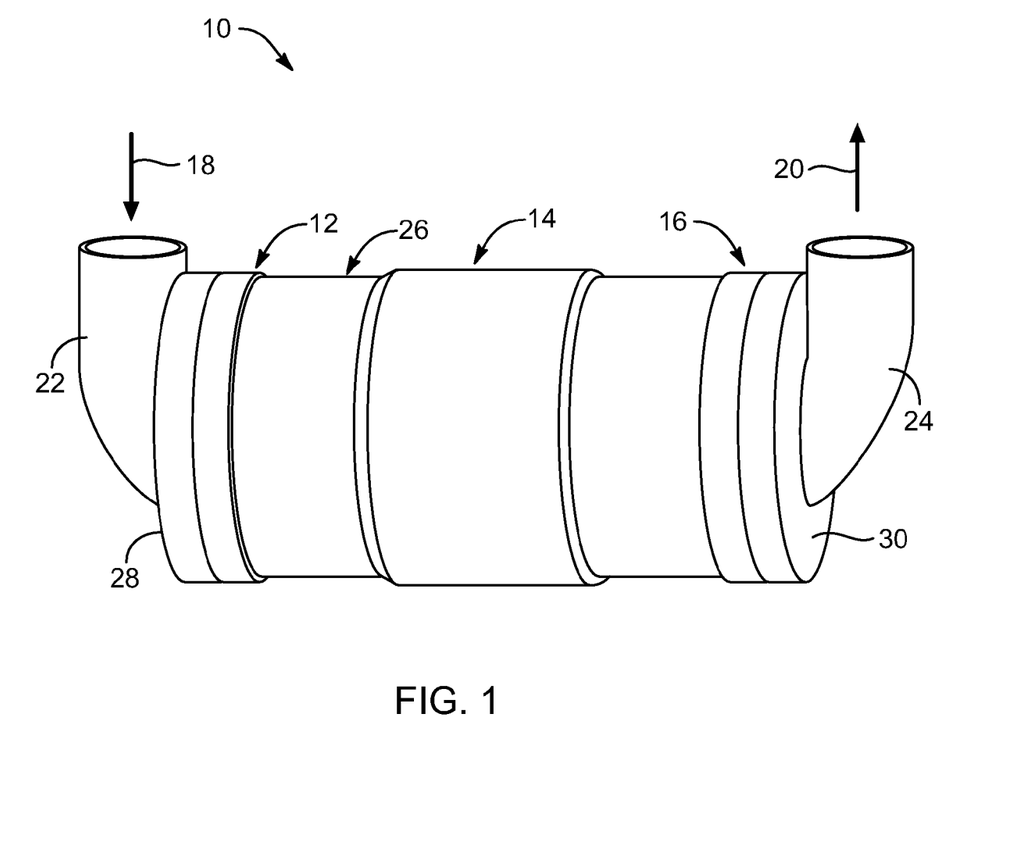
FIG. 1 is a perspective view of an exhaust aftertreatment component according to one embodiment.

In one specific embodiment illustrated in FIG. 1, a component 10 of an exhaust aftertreatment system (not shown) includes a first particulate filter section 12, an oxidation catalyst section 14 downstream of the first particulate filter section 12, and a second particulate filter section 16 downstream of the oxidation catalyst section. The component 10 includes an exhaust inlet 22 for receiving exhaust gas 18 and an exhaust outlet 24 for expelling exhaust gas 20 from the component. The exhaust inlet 22 and outlet 24 are coupled to a housing 26 of the component 10. The housing extends from a first end 28 to a second end 30. Exhaust gas 18 entering the component 10 through the exhaust inlet 22 passes through the first particulate filter section 12, oxidation catalyst section 14, and second particulate filter section 16 before exiting the component through the exhaust outlet 24. In some implementations, the second particulate filter section 16 is substantially a mirror image of the first particulate section 12. Accordingly, the general features of the first particulate section 12 described in more detail below may apply equally to the second particulate section 16.

Figure 2:
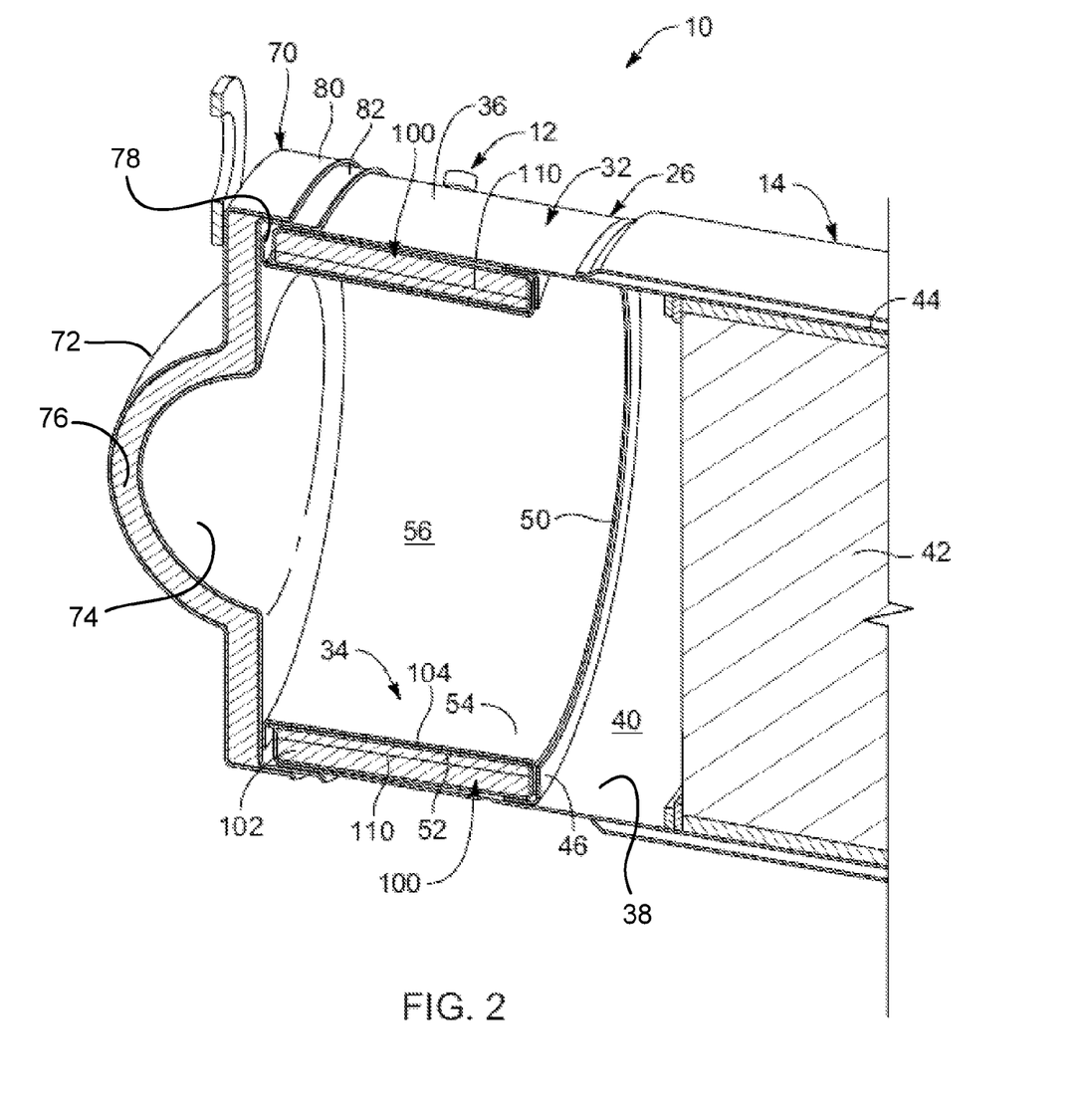
FIG. 2 is a cross-sectional perspective view of the exhaust aftertreatment component of FIG. 1.

Referring to FIG. 2, the housing 26 includes an outer body 32 and an inner body 34. The outer body 32 includes a generally cylindrically-shaped tubular element extending from about the first end 28 of the housing 26 to about the second end 30 of the housing. The outer body 32 further includes an outer or exterior surface 36 and an opposing inner surface 38. The outer body 32 has a first outer diameter D1 along the first filter section 12 (see FIG. 4). The inner surface 38 of the outer body 32 defines a first interior cavity 40. The interior cavity 40 along the first filter section 12 has a second diameter D2 (see FIG. 4). The oxidation catalyst section 14 includes an oxidation catalyst 42 positioned within the first interior cavity 40 and may include an external insulation layer 44 extending about the exterior surface 36. The filter section 12 includes an annular stop 46 secured to the inner surface 38 of the outer body 32 at a location intermediate the oxidation catalyst 42 and the first end 28. The stop 46 extends radially inward from the inner surface 38 toward a central axis 48 of the component 10 (see FIG. 3) and defines an aperture 50 through which exhaust is flowable into the oxidation catalyst section 14.

Figure 3:
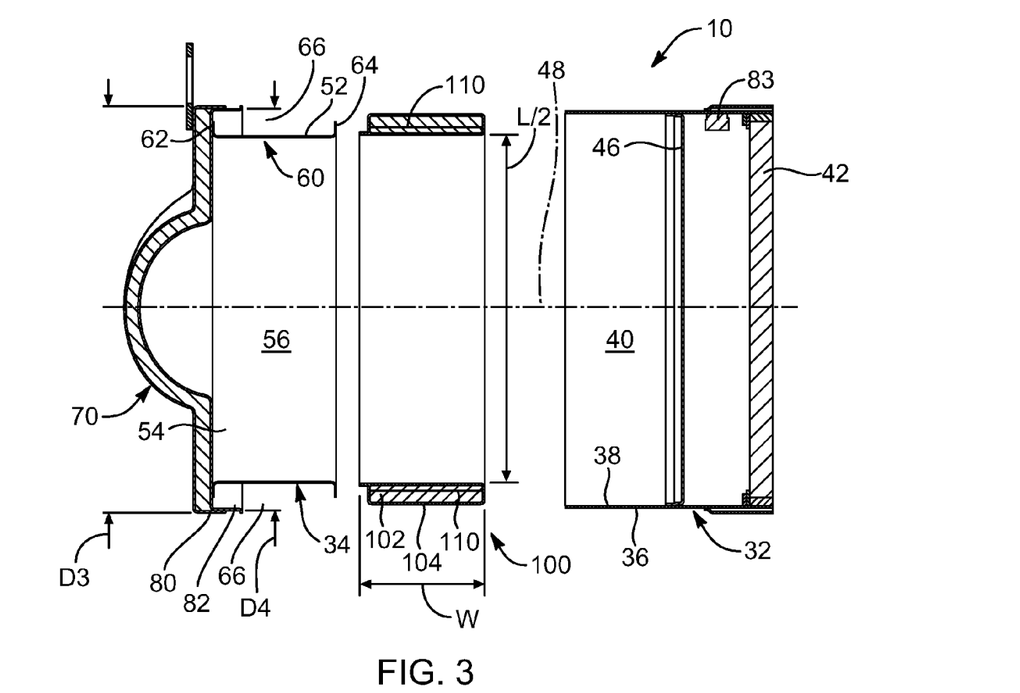
FIG. 3 is an exploded cross-sectional side view of the exhaust aftertreatment component of FIG. 1.

The inner body 34 includes a generally cylindrically-shaped tubular element that has an outer surface 52 and an opposing inner surface 54 (see, e.g., FIG. 3). The inner surface 54 defines a second interior cavity 56 in which filter media (not shown) is positionable. The filter media typically includes a cylindrically shaped filter having any of variously shaped channels through which exhaust flows. As the exhaust passes from one channel to another, particulate matter is filtered from the exhaust and builds up on the walls of the channels. Eventually, the built-up particulate matter is burnt off in a filter regeneration event. In the illustrated embodiment, the filter media is removed to more clearly show the features of the inner body 34.

Referring to FIGS. 2 and 3, the inner body 34 is generally U-shaped in cross-section with an inner wall 60 positioned between two spaced-apart side walls 62, 64 extending substantially radially outward (e.g., substantially perpendicularly) from the inner wall 60 away from the central axis 48. The space defined between the inner wall 60 and side walls 62, 64 forms an annular-shaped insulation pack receiving space 66. The inner body 34 is secured to a first end section 70 of the housing 26. The first end section 70 defines the first end 28 of the housing 26 and the exhaust inlet 22 is coupled to the first end section 70. The first end section 70 includes an outer shell 72, an inner shell 74, and insulation media 76 positioned between the outer and inner shells. The inner body 34 is secured to the first end section 70 by coupling the side wall 62 to the inner shell 74. The side wall 62 can be coupled to the inner shell 74 using any of various coupling techniques known in the art, such as, for example, welding, bonding, adhesion, and fastening with fasteners. Preferably, the inner body 34 is secured to the inner shell 74 such that the inner wall 60 of the inner body 34 extends substantially perpendicularly away from the inner shell (e.g., substantially parallel to the central axis 48).

Referring to FIG. 2, a space or compartment 78 is defined between the outer body 32 and the inner body 34. Generally, the compartment 78 includes the insulation receiving space 66 bounded by the inner surface 38 of the outer body 32. In the illustrated embodiment, the compartment 78 is enclosed via contact between the outer body 32, inner body 34, stop 46, and first end section 70. In some implementations, as will be described in more detail below in relation to FIG. 9, the compartment 78 is enclosed despite having one or more gaps between the inner and outer bodies 32, 34. Contact between the outer body 32, inner body 34, stop 46, and first end section 70 of the component 10 does not necessarily provide a seal that prevents exhaust gas from passing between the portions. In some implementations, the portions can be fully welded together to form a hard seal between the portions. However, full welds can be costly and time consuming, which burdens the manufacturing process. To avoid such manufacturing process burdens, as will be described in more detail below, in some implementations, the portions are held in contact with each other via frictional engagement, light pressure, or partial welds. While these coupling techniques reduce manufacturing time and costs, the interface between the portions may not provide a seal that prevents exhaust bypass.

The outer shell 72 of the first end section 70 includes a lip portion 80 extending substantially perpendicularly away from the first end 28 of the housing 26 and substantially parallel to the central axis 48. The lip portion 80 defines a cylindrically shaped space that has a third diameter D3. Similarly, the inner shell 74 of the first end section 70 includes a lip portion 82 extending downstream away from the first end 28. The lip portion 82 has a fourth maximum inner diameter D4 and a maximum outer diameter approximately equal to the third diameter D3. The fourth diameter D4 of the lip portion 82 is just smaller than the first outer diameter D1 of the outer body 32. The lip portion 82 of the inner shell 74 can extend from the first end 28 in a radially inwardly direction toward the central axis 48 and have a radially outwardly curved tip. The cylindrically shaped space defined by the lip portion 80 of the outer shell 72 receives a portion of the insulation 76 and a portion of the inner shell 74 such that the lip portion 80 at least partially surrounds the lip portion 82 of the inner shell 74. The lip portion 80 can be secured to the lip portion 82 using any of various coupling techniques, such as welding.

Although the component shown is a combination particulate filter and oxidation catalyst, the component can be any of various components utilized in exhaust aftertreatment systems configured to remove or reduce harmful particulates or emissions from exhaust gas generated by an internal combustion engine. For example, in some implementations, the component can be a particulate filter, oxidation catalyst, a selective catalytic reduction (SCR) catalyst, or an ammonia oxidation catalyst. Further, although in the illustrated embodiment the component 10 is shown as being generally cylindrical in cross-section, in other embodiments, the component 10 can have any of various cross-sectional shapes other than cylindrical, such as rectangular, ovular, and elliptical.

Figure 6:
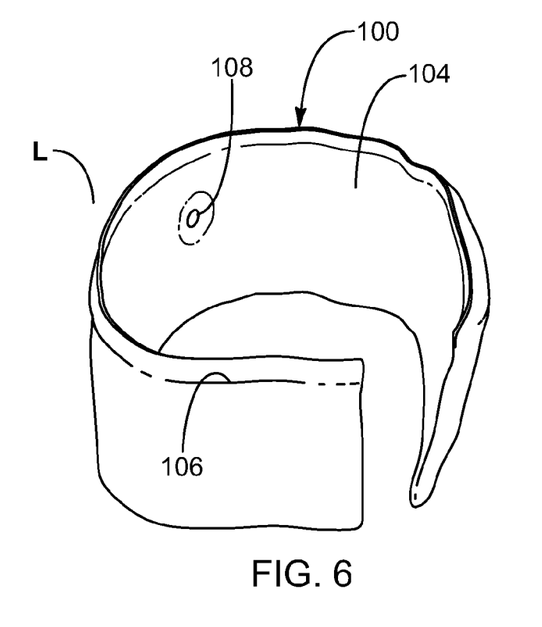
FIG. 6 is a perspective view of an insulation pack according to one embodiment.

As shown in FIG. 2, the component 10 includes an insulation pack 100 positioned along an interior of the component. Generally, the insulation pack 100 is used to insulate the outer contact surface of an exhaust aftertreatment component from the hot exhaust gas passing through the component. Referring to FIGS. 2 and 6, the insulation pack 100 includes a length of insulation media 102 encapsulated by a fabric 104. The insulation pack 100 is generally flexible along its length L, but substantially rigid along its width W. For example, as shown in FIGS. 3 and 6, the insulation pack 100 is flexed along its length L to form a generally curved or annular shape. The insulation media 102 can be any of various insulation media known in the art made from any of various insulating materials, such as, for example, carbon, silica, fiberglass, cellulose, polyurethane, polystyrene, and ceramic. In some implementations, the insulation media 102 includes a plurality of insulating fibers made of the insulating materials. Preferably, the fabric 104 is at least partially flexible, capable of withstanding high temperatures, e.g., above 1,800° F. inclusive and substantially flame-resistant. In certain implementations, the fabric 104 is less rigid than the insulation media 102. As shown in FIG. 6, in one embodiment, one or more pieces of fabric 104 is placed over the entire insulation media 102 and the fabric encapsulates the media by sewing seams 106 in the fabric, e.g., coupling the fabric together, along each edge of the media. In other embodiments, the seams are created using an adhesive or other bonding technique.

In an unflexed state, the insulation pack 100 can have a generally rectangular shape according to the illustrated embodiment. Alternatively, the insulation pack 100 can have any of various shapes suitable for the particular application or type of component being used. For example, the edges of the insulation pack can have notches, holes, or curves in order to be laid around any impeding structures or geometries of the aftertreatment component. Further, as shown in FIG. 6, apertures, such as aperture 108, can be formed in the insulation pack 100 to accommodate component features, such as sensors or sensor ports, e.g., sensor port 83 (see FIGS. 3-5).

As shown in FIG. 2, the insulation pack 100 includes an axial stabilizer 110 extending across a substantial portion of the width of the insulation pack. The insulation pack 100 is configured to be radially compressible and substantially axially incompressible. To be substantially axially incompressible, the insulation pack 100 need not be completely axially incompressible, but can include an insignificant, minor, or slight amount of compression. In one implementation, substantially axially incompressible is defined to include any amount of axial compressibility that does not result in a build-up of the insulation pack against the outer body 32 during assembly of the component 10 (see FIG. 8 below).

The axial stabilizer 110 substantially prevents flexing, bending, or compression along a width of the insulation pack. As will be described in more detail below, when installed in the filter section 12, the width of the insulation is substantially parallel to the central axis 48 of the component 10. Accordingly, the stabilizer 110 is an axial stabilizer because it resists flexing, bending, or compression of the insulation pack 100 in an axial direction, i.e., a direction substantially parallel to the central axis 48 of the component 10. Generally, the axial stabilizer 110 has a rigidity in the axial direction that is greater than the rigidity of the insulation media 102 and fabric 104 in the axial direction. The axial stabilizer 110 can be any of various devices, members, or elements that are at least partially rigid in the axial direction. In certain implementations, the axial stabilizer 110 is a foil, sheet, rod, or binder that occupies a relatively small portion, e.g., less than 50%, of the thickness of the insulation pack 100. The axial stabilizer 110 can be flat or undulated, such as including corrugations. The axial stabilizer can be made of any of various materials configured to resist extreme temperature or be combustible above certain temperature thresholds, such as metal, cardboard, plastic, combustible chemicals, adhesive (e.g., a binder), and, as described in more detail below, the insulation media itself.

As shown in FIG. 2, the axial stabilizer 110 is embedded within the insulation media 102 and extends from an upstream side of the insulation pack to a downstream side of the insulation pack. For example, the axial stabilizer 110 can be a metal foil positioned between two insulation layers. Similarly, the axial stabilizer 110 can be a hardened adhesive or binder applied between two insulation layers and configured to bind the layers together. Alternatively, the axial stabilizer 110 can be positioned between the insulation media 102 and the fabric 104. In yet other implementations, the axial stabilizer 110 is secured to the exterior of the insulation pack 100, such as a cardboard stabilizer configured to combust during operation of the component 10. The axial stabilizer 110 can be secured to the media 102 and/or the fabric 104. Alternatively, the axial stabilizer 110 can be a floating component, i.e., not secured to either the media 102 or the fabric 104.

Figure 4:
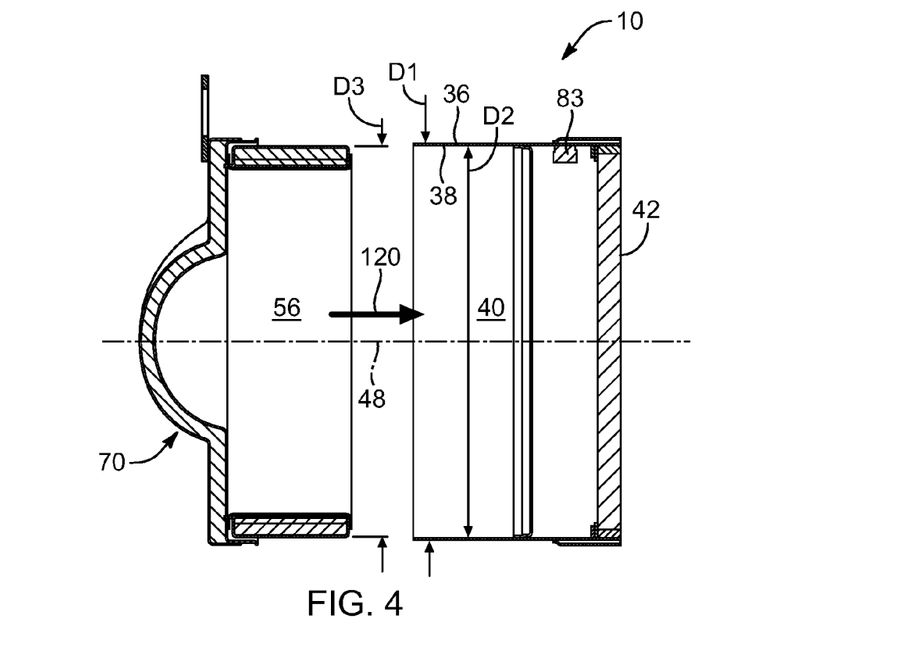
FIG. 4 is an exploded cross-sectional side view of the exhaust aftertreatment component of FIG. 1 shown with an insulation pack around an inner body.
Figure 5:
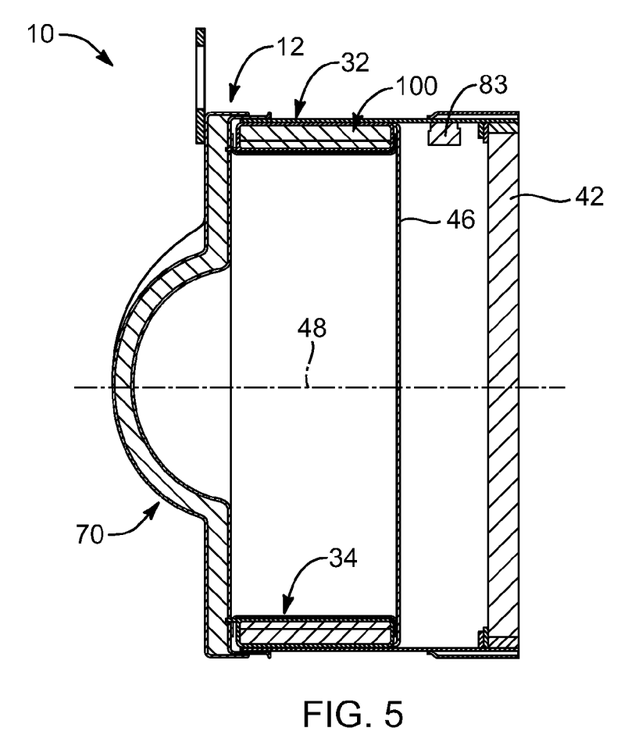
FIG. 5 is a cross-sectional side view of the exhaust aftertreatment component of FIG. 1.
Figure 7:
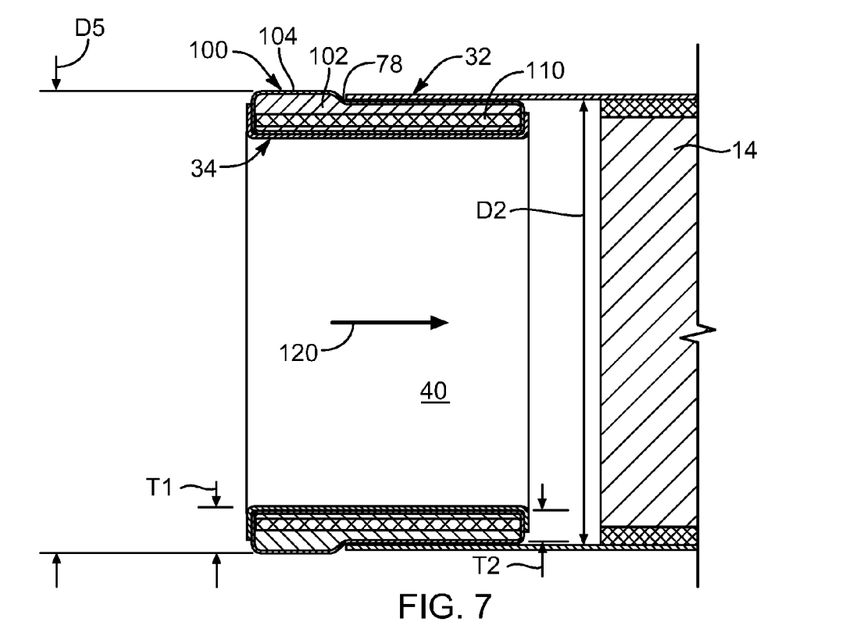
FIG. 7 is a cross-sectional side view of the exhaust aftertreatment component of FIG. 1 showing the installation of the insulation pack.

Referring to FIG. 3, the outer body 32, end section 70, inner body 34, and the insulation pack 100 can be assembled together to form the component 10. Referring to FIG. 4, the insulation pack 100 is wrapped around the inner body 34 within the receiving space 66. The inner diameter of the inner body 34 plus the thickness of the insulation pack 100 defines a fifth diameter D5. The fifth diameter D5 is greater than the second diameter D2 of the interior cavity 40 of the outer body 32. The end section 70, inner body 34, and insulation pack 100 assembly is inserted into the interior cavity 40 of the outer body 32 such that the outer body 32 surrounds the inner body 34 and the insulation pack 100 is positioned within the compartment 78 between the inner and outer bodies (see FIG. 5). Referring to FIG. 7, as the inner body 34 is inserted into the outer body 32, the insulation pack 100 is inserted, e.g., stuffed, in the compartment 78. In other words, because the diameter D5 of the combined inner body 34 and insulation pack 100 is greater than the diameter D2 of the interior space 40 of the outer body 32, as the inner body 34 is inserted into the outer body 32, the outer body wall contacts and radially compresses the insulation pack. In this manner, the insulation pack 100 is maintained in compression between the outer and inner bodies 32, 34 during use of the component 10. As shown in FIG. 7, the insulation pack 100 has a first thickness T1 in an uncompressed state prior to being stuffed in the compartment 78 and a smaller second thickness T2 in a radially compressed state after being stuffed in the compartment.

Figure 8:
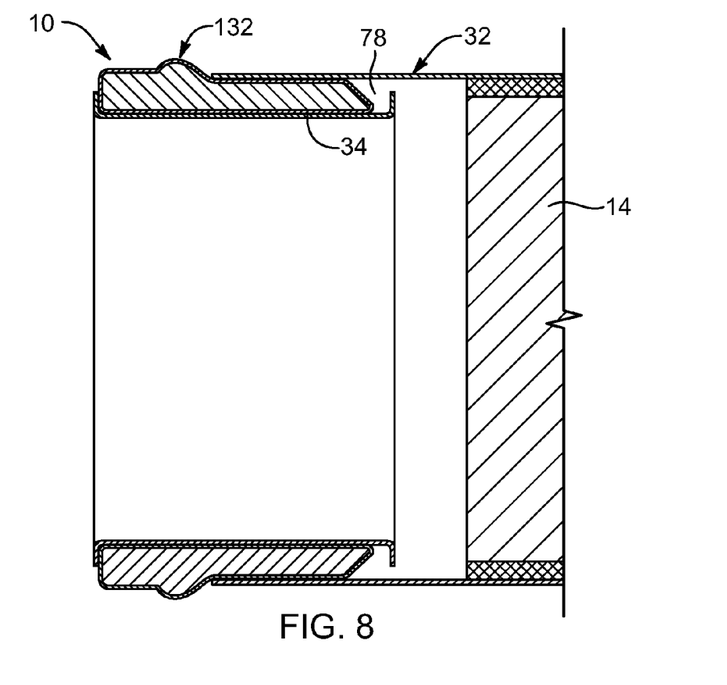
FIG. 8 is a cross-sectional side view of an exhaust aftertreatment component according to another embodiment showing the installation of an insulation pack without an axial stabilizer.

As the insulation pack 100 is stuffed into the compartment 78 in the axial direction as indicated by directional arrow 120, the axial stabilizer 110 resists axial compression of the insulation pack. Referring to FIG. 8, an insulation pack 130, similar to insulation pack 100 but without the axial stabilizer 110, is shown being inserted or stuffed into the compartment 78. Because the insulation pack 130 is not axially rigid, as it is inserted into the compartment 78, it is axially compressed and bunches or builds-up at the point of contact with the outer body 32. The build-up 132 at the point of entry into the compartment 78 restricts or prevents further insertion of the insulation pack 130 into the compartment. Without the use of tools and additional manufacturing steps, which would impede the manufacturing process, the insulation pack 130 would not be fully insertable into the compartment 78 due to the impendence of the build-up 132. The resistance to axial compression provided by the axial stabilizer 110 reduces build-up at the point of entry into the compartment 78 and allows the insulation pack 100 to be completely inserted into the compartment without significant resistance difficultly or the use of extraneous tools and processes.

As the insulation pack 100 is radially compressed, the flexible fabric 104 conforms to, e.g., deforms against, the walls of the outer body 32, inner body 34, and in some instances, the stop 46 that define the compartment 78 to form a seal between the insulation pack and walls. The compression of the insulation pack 100 maintains sealing engagement between the walls. The seal restricts, and, in some implementations, prevents exhaust bypass, i.e., exhaust gas passing between the insulation pack 100 and walls of the outer and inner bodies 32, 34. In this manner, a seal for preventing exhaust bypass is provided where wall-to-wall contact (e.g., contact between the stop 46 and inner body 34) or light welds (e.g., welds at the interface between the inner body 34 and inner shell 74, or between the outer body 32 and stop) do not provide an adequate exhaust bypass seal.

Figure 9:
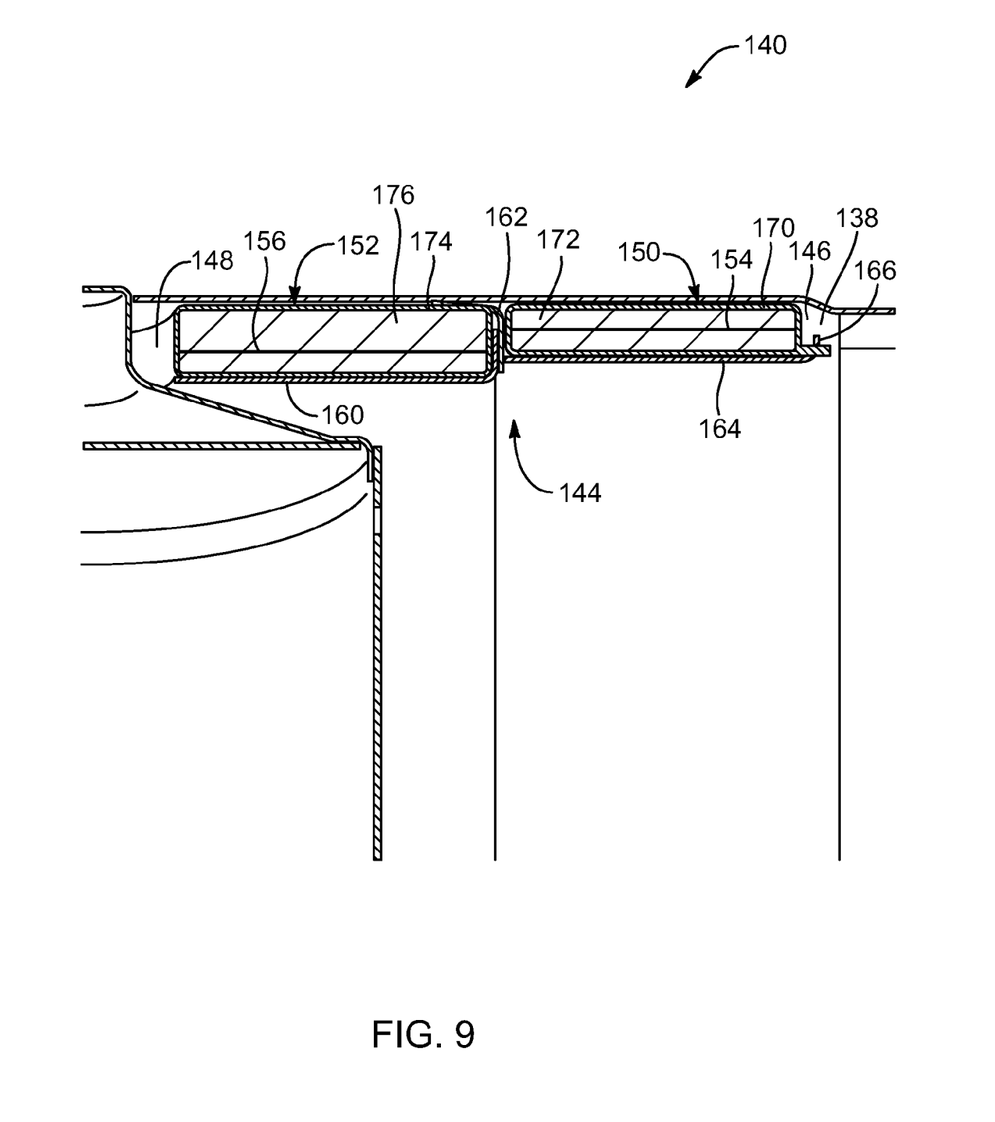
FIG. 9 is a cross-sectional side view of an exhaust aftertreatment component that has multiple insulation packs according to another embodiment.

Additionally, in some embodiments, there may not be wall-to-wall contact or welds between the outer body, inner body, and stop such that the compartment is not fully enclosed. For example, as shown in FIG. 9, a gap 138 exists between an outer body 142 and an inner body 144 of a component 140. The component 140 is similar to component 10 except the inner body 144 includes a second insulation pack receiving area 146 adjacent a first pack receiving area 148. The inner body 144 is configured to receive two insulation packs 150, 152 in the first and second receiving areas 146, 148, respectively, in a side-by-side manner. The insulation packs 150, 152 include a respective flexible fabric 170, 174 encapsulating a respective insulation media 172, 176, as well as an axial stabilizer 154, 156, respectively. The wall 160 defining the first receiving area 148 is secured to an annular mounting bracket 162 similar to stop 46. The mounting bracket 162 is secured to the inner body 144. The second receiving area 146 is defined by a wall 164 secured to and extending substantially perpendicularly away from the mounting bracket 162. The wall 164 terminates at a downstream end 166 spaced apart from the outer body 142 such that the gap 138 is defined between the downstream end and the outer body.

The component 140 is assembled in a manner similar to component 10 with the insulation packs 150, 152 wrapped around the inner body 144, and the inner body 144 and insulation packs 150, 152 combination inserted into the outer body 142. The outer body 142 radially compresses both insulation packs 150, 152 as the inner body 144 is inserted into the outer body 142. The radial compression of the insulation packs 150, 152 results in the fabric forming seals between the outer and inner bodies 142, 144 and the respective insulation packs. Therefore, although exhaust gas is allowed to flow through the gap 138, contact the insulation pack 150, and contact a small portion of the outer body 142, the seal formed by the insulation pack 150 prevents exhaust bypass between the insulation pack and the outer body. Although the gap 138 is defined between the end 166 of the inner body 144 and outer body 142, other embodiments can have one or more gaps at various other locations. Notwithstanding the number or size of the gaps, the presence of such gaps does not negatively affect the insulating proportions of the insulation pack because of the ability of the insulation pack to form a seal when compressed. Because tight tolerances and close fits typically necessary to avoid gaps would not be required to seal the insulation compartments, manufacturing and assembly costs can be reduced.

Figure 10:
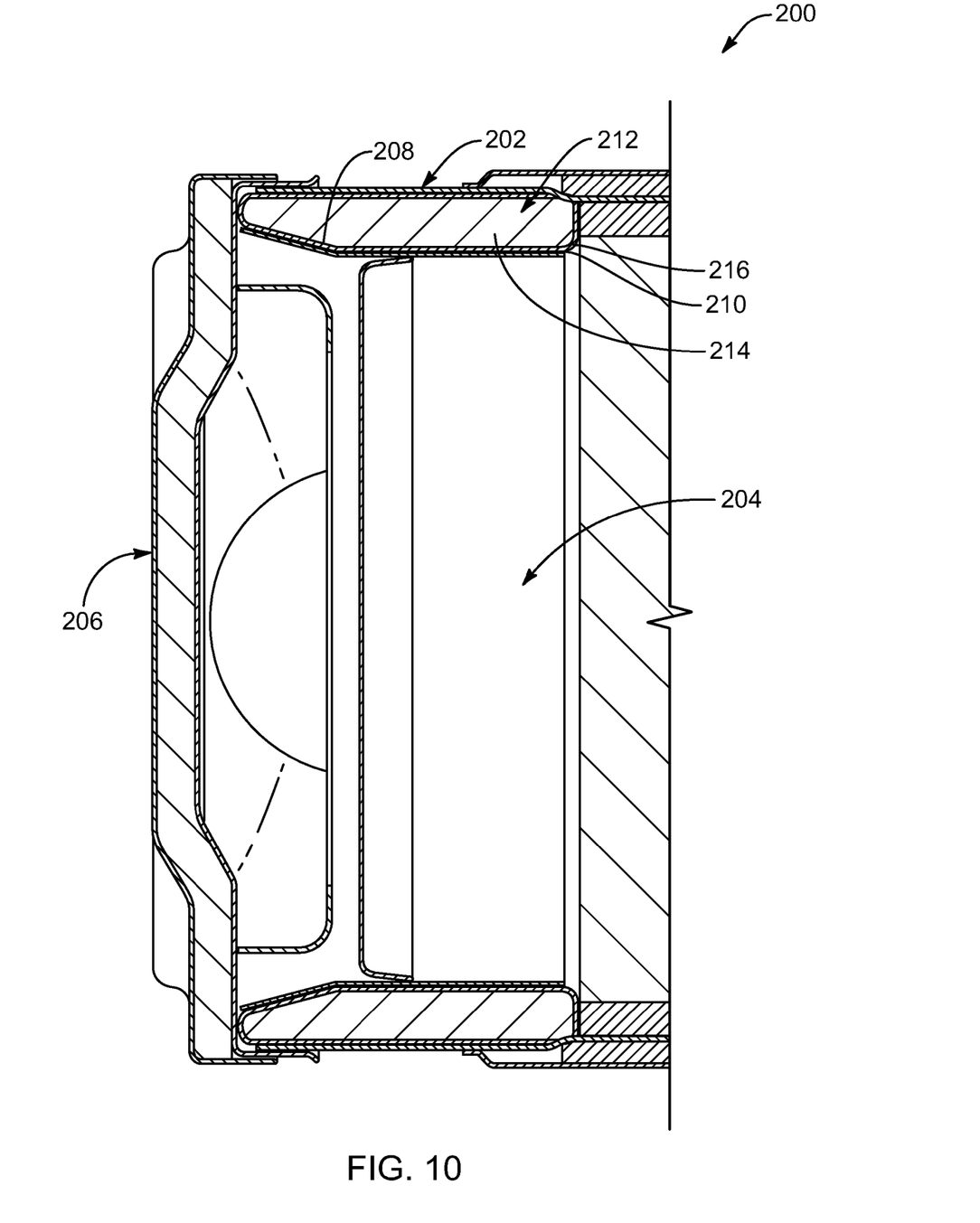
FIG. 10 is a cross-sectional side view of an exhaust aftertreatment component with an insulation pack having axially rigid insulation media according to another embodiment.

Referring to FIG. 10, and according to another embodiment, a portion of an exhaust aftertreatment component 200 is shown. Similar to component 10, component 200 includes an outer body 202, inner body 204, and first end section 206. The inner body 204 includes an outer support surface 208 that defines an insulation pack receiving space 210. The component 200 includes an insulation pack 212 that is wrapped around receiving space and inserted into the outer body 202 in a manner similar to that described above. The outer body 202 radially compresses the insulation pack 212 as it is inserted into the outer body 202. The insulation pack 212 includes an insulation media 214 encapsulated by a fabric layer 216. Radial compression of the insulation layer causes the fabric layer 216 to conform to adjacent surfaces to provide a seal against exhaust bypass. Unlike the insulation pack 100 described above, the insulation pack 212 does not include a separate axial stabilizer element. Rather, the insulation media 214 itself is configured to be radially compressible and axially incompressible so as to resist bunching during installation of the insulation pack 212 in the outer body 202 as described above. In certain implementations, the insulation media 214 includes a plurality of at least partially rigid insulation fibers orientated in the axial direction. In this manner, the insulation media 214 is rigid in the axial direction, but compressible or flexible in the radial direction.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An exhaust aftertreatment component, comprising:
    a housing defining an interior cavity through which exhaust gas is flowable, the housing comprising an inner body, an outer body, and a space defined between the inner and outer bodies; and
    an insulation pack positioned within the space, the insulation pack comprising insulation media fully encapsulated by a flexible fabric, the insulation pack further comprising an at least partially rigid member having a rigidity greater than a rigidity of the insulation media and flexible fabric, the at least partially rigid member being fully encapsulated by the flexible fabric.

2. The exhaust aftertreatment component of claim 1, wherein the insulation pack comprises a length extending substantially perpendicular to an axis of the housing, and wherein the rigidity of the at least partially rigid member, the insulation media, and the flexible fabric comprises an axial rigidity substantially parallel to the axis of the housing.

3. The exhaust aftertreatment component of claim 1, wherein the at least partially rigid member comprises a sheet.

4. The exhaust aftertreatment component of claim 1, wherein the at least partially rigid member is embedded within the insulation media.

5. The exhaust aftertreatment component of claim 1, wherein the at least partially rigid member is secured to an exterior surface of the flexible fabric.

6. The exhaust aftertreatment component of claim 1, wherein the at least partially rigid member extends laterally from a first side of the insulation pack to a second side of the insulation pack.

7. The exhaust aftertreatment component of claim 1, wherein the outer body compresses the insulation pack against the inner body in a direction substantially perpendicular to an axis of the component.

8. The exhaust aftertreatment component of claim 1, wherein the insulation pack forms a seal with the inner and outer bodies to prevent exhaust gas from passing between the insulation pack and the inner and outer bodies.

9. The exhaust aftertreatment component of claim 1, wherein the inner body is insertable into the outer body.

10. The exhaust aftertreatment component of claim 9, wherein the inner body has a generally cylindrical shape and comprises an inner wall and two spaced-apart side walls extending radially outward from the inner wall.

11. The exhaust aftertreatment component of claim 10, wherein the space is defined between the outer body and the inner wall and two side walls of the inner body, and wherein a gap is defined between at least one of the two side walls of the inner body and the outer body, and wherein the flexible fabric of the insulation pack is contactable with hot exhaust gas passing through the gap.

12. The exhaust aftertreatment component of claim 1, wherein the at least partially rigid member is configured to combust during operation of the component.

13. An exhaust aftertreatment component, comprising:
    insulation pack comprising insulation media fully encapsulated by a flexible fabric, the insulation pack further comprising a rigid member having a rigidity greater than a rigidity of the insulation media and flexible fabric, the rigid member being fully encapsulated by the flexible fabric.

14. The exhaust aftertreatment component of claim 13, further comprising:
    an outer body;
    an inner body spaced apart from the outer body; and
    a compartment defined between the outer and inner bodies, wherein the insulation pack is positioned within the compartment;
    wherein the outer body applies a compressive force to the insulation pack to compress the insulation pack against the inner body, and
    wherein the insulation pack is deformable under the compressive force to form a seal between the outer and inner bodies.

15. The exhaust aftertreatment component of claim 14, wherein the compressive force is a radial compressive force perpendicular to a central axis of the component, and the rigid member having an axial rigidity greater than an axial rigidity of the insulation pack and flexible fabric.

16. The exhaust aftertreatment component of claim 14, wherein the compressive force is a radial compressive force perpendicular to a central axis of the component, and the insulation media has an axial rigidity greater than a radial rigidity.

17. A method for making an exhaust aftertreatment component, comprising:
    providing a first body comprising a first inner surface defining a first interior cavity and a first outer surface;
    providing a second body comprising a second inner surface defining a second interior cavity and a second outer surface;
    positioning an insulation pack about the first body along the first outer surface, the insulation pack comprising insulation media fully enveloped by a fabric, and the insulation pack further comprising an at least partially rigid member having a rigidity greater than a rigidity of the insulation media and flexible fabric, the at least partially rigid member being fully enveloped by the flexible fabric;
    inserting the first body into the second interior of the second body such that the insulation pack is positioned between the first outer surface and the second inner surface; and
    compressing the insulation pack with the second body as the first body is inserted into the second interior of the second body.

18. The method of claim 17, wherein the first and second bodies are each generally cylindrically shaped, wherein compressing the insulation pack comprises radially inwardly compressing the insulation pack.

19. The method of claim 18, wherein inserting the first body into the second interior of the second body comprises inserting the first body into the second interior of the second body in a substantially axial direction.

20. The method of claim 18, further comprising resisting axial compression of the insulation pack as the first body is inserted into the second interior of the second body.

21. The method of claim 20, wherein the at least partially rigid member is an axially rigid member, and wherein the axial compression resistance is facilitated by the axially rigid member.

22. The method of claim 20, wherein the insulation media of the insulation pack is axially rigid, and wherein the axial compression resistance is facilitated by the axially rigidity of the insulation media.

23. The method of claim 17, wherein the insulation pack comprises a first thickness prior to the first body being inserted into the second interior of the second body, the first thickness being greater than a maximum distance between the first outer surface and second inner surface after the first body is inserted into the second interior of the second body, and wherein compressing the insulation pack comprises reducing a thickness of the insulation pack from the first thickness to a second thickness approximately equal to the maximum distance between the first outer surface and the second inner surface.

24. The method of claim 17, further comprising deforming the insulation pack into sealed engagement with the first outer surface and second inner surface.

25. The method of claim 17, further comprising sealing the first outer surface and second inner surface with the insulation pack.

26. An exhaust aftertreatment component comprising:
an insulation pack comprising:
an insulation media; and
a flexible fabric fully encapsulating the insulation media;
wherein the insulation pack has an axial rigidity and a radial rigidity, wherein the axial rigidity is greater than the radial rigidity.

27. The insulation pack of claim 26, further comprising an axial stabilizer coupled to at least one of the insulation media and flexible fabric.

28. The insulation pack of claim 27, wherein the axial stabilizer comprises a substantially rigid metal foil having an axial rigidity greater than an axial rigidity of the insulation media and the flexible fabric.

29. The insulation pack of claim 27, wherein the insulation media comprises at least two insulation media layers, and wherein the axial stabilizer comprises an adhesive coupling the insulation media layers together.

30. The insulation pack of claim 26, further comprising means for providing axial rigidity.

\* \* \* \* \*